US007107040B2

(12) United States Patent
Study et al.

(10) Patent No.: US 7,107,040 B2
(45) Date of Patent: Sep. 12, 2006

(54) METHOD AND APPARATUS FOR DISPLAYING BLOCKED TRANSMITTER INFORMATION

(75) Inventors: Robert Study, Arlington Heights, IL (US); Eric Robb, Carol Stream, IL (US); Robert Rainey, Temecula, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 640 days.

(21) Appl. No.: 10/073,667

(22) Filed: Feb. 11, 2002

(65) Prior Publication Data

US 2003/0153301 A1 Aug. 14, 2003

(51) Int. Cl.
*H04M 1/66* (2006.01)

(52) U.S. Cl. ...................................... 455/410; 340/5.64

(58) Field of Classification Search ................ 455/411, 455/418, 410; 340/5.53, 5.64, 5.71, 5.26, 340/42, 5.22, 825.75, 5.23, 5.61, 5.8, 5.86, 340/5.31, 5.32, 5.7, 5.81; 713/200; 160/188; 34/5.53; 342/42

See application file for complete search history.

(56) References Cited

U.S. PATENT DOCUMENTS

| | | | |
|---|---|---|---|
| RE29,525 E | 1/1978 | Willmott | |
| 4,385,296 A | 5/1983 | Tsubaki et al. | |
| 4,750,118 A | 6/1988 | Heitschel et al. | |
| 4,855,713 A | 8/1989 | Brunius | |
| 4,859,900 A | 8/1989 | Isaacman | |
| 5,251,033 A | 10/1993 | Anderson et al. | |
| 5,450,087 A * | 9/1995 | Hurta et al. | 342/42 |
| 5,473,318 A | 12/1995 | Martel | |
| RE35,364 E | 10/1996 | Heitschel et al. | |
| 5,781,143 A | 7/1998 | Rossin | |
| 5,933,773 A | 8/1999 | Barvesten | |
| RE36,703 E | 5/2000 | Heitschel et al. | |
| 6,166,650 A | 12/2000 | Bruwer | |
| 6,289,214 B1 | 9/2001 | Backstrom | |
| 6,360,092 B1 | 3/2002 | Carrara | |
| 2003/0033540 A1* | 2/2003 | Fitzgibbon | 713/200 |
| 2003/0210131 A1* | 11/2003 | Fitzgibbon et al. | 340/5.53 |

FOREIGN PATENT DOCUMENTS

| | | | |
|---|---|---|---|
| EP | 0 776 141 A2 | 5/1997 | |
| WO | WO 03/063442 A2 | 7/2003 | |

OTHER PUBLICATIONS

International Search Report for PCT patent application PCT/US03/03681 mailed on Feb. 26, 2004.

* cited by examiner

*Primary Examiner*—Edward F. Urban
(74) *Attorney, Agent, or Firm*—Fitch, Even, Tabin & Flannery

(57) ABSTRACT

A control unit 11 for a movable barrier operator and having a user interface having a display 31 can provide information on that display 31 of all presently blocked remote control transmitters without necessitating the display of any non-blocked transmitter information. In one embodiment the information is displayed one transmitter at a time, either automatically or in response to the user's actions.

15 Claims, 3 Drawing Sheets

METHOD AND APPARATUS FOR DISPLAYING BLOCKED TRANSMITTER INFORMATION

TECHNICAL FIELD

This invention relates generally to wireless communications and more particularly to management of information regarding registered but blocked transmission sources.

BACKGROUND

It is known to include a unique identifier or other identification or authentication mechanism in a wireless communication to confirm for a recipient the identity of the transmission source. For example, movable barrier operators that control the operation of a movable barrier often have some mechanism for recognizing a valid transmission to ensure that unauthorized transmitters do not effect control of the movable barrier. In some settings, such as movable barrier operators that are employed at apartment complexes, businesses and other campuses, military posts, and so forth, a large number of transmitters must often be registered and known to the movable barrier operator (in these examples, hundreds of transmitters, each with a unique identifier, must often be registered and the number can be even greater).

From time to time, for various reasons, a registered transmitter must be temporarily blocked from being recognized as an authorized transmitter. For example, when an individual is known to be away for some period of time, the transmitter that is assigned to that individual should be blocked so that unauthorized individuals can not use it to gain inappropriate access through the corresponding movable barrier. Prior art mechanisms provide for such blocking and the removal of such a blocking categorization without necessitating a complete removal and subsequent re-entry of the relevant information. Unfortunately, the present solutions do not address all needs of all users. For example, it can be difficult to ascertain which transmitters are blocked at any given moment without entering, for example, the identifying information for that specific transmitter and inspecting the corresponding stored contents.

BRIEF DESCRIPTION OF THE DRAWINGS

The above needs are at least partially met through provision of the method and apparatus for displaying blocked transmitter information described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Generally speaking, pursuant to these various embodiments, a control unit has a memory containing information regarding various transmitters. This information includes both identifying information as used by the control device upon receiving a transmission from a transmitter to confirm its authorized status and blocking status information as may correspond to any given previously registered transmitter. Upon detecting a particular user input, which user input constitutes a command to display blocked information, the control unit displays through a user interface at least a first memory location that corresponds to a memory location that contains a unique identifier for a transmitter that is presently blocked. In one embodiment, additional memory locations for additional blocked transmitters are sequentially presented with each assertion of a specific user interface input. So configured, a user can easily determine which memory locations pertain to blocked transmitters. Such information can then be used in various ways to support the management of the overall system.

Referring now to the figures, additional details regarding these and other embodiments will be provided.

Figure 1:
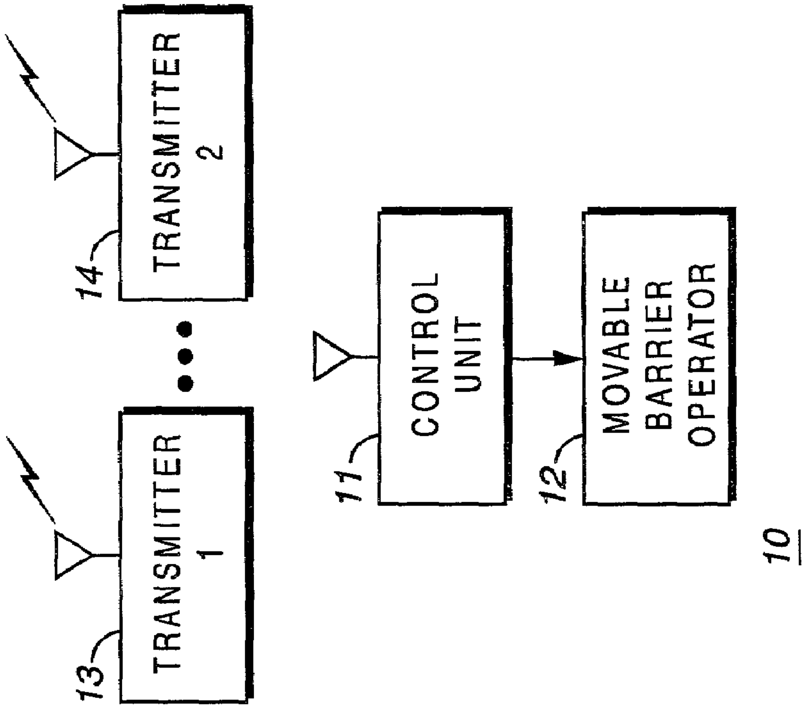
FIG. 1 comprises a block diagram depiction of a system embodiment configured in accordance with the invention.

Referring now to FIG. 1, a given system 10, in this embodiment, includes a control unit 11 that is coupled to a movable barrier operator 12 such that the control unit 11 can provide control signals to the movable barrier operator 12 to thereby control, at least to some extent, a movable barrier as operated by the movable barrier operator 12. The control unit 11 provides such control signals in response to receiving appropriate transmissions from any of a plurality of previously registered remote control transmitters (represented here by transmitter 1 and transmitter 2 as denoted by reference numerals 13 and 14). The number of transmitters supported will vary with the application, and will typically number in the hundreds, though 1,000 or more are certainly possible. In this particular embodiment, up to 250 such transmitters are presumed to be supported by the system 10. Pursuant to the embodiments described below, blocking information as known to the control unit 11 can be made easily available to a user to support management of the information.

Figure 2:
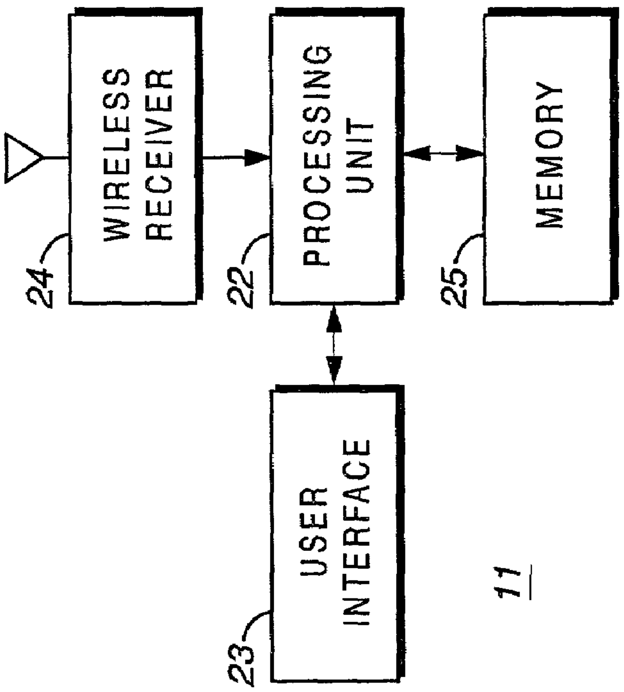
FIG. 2 comprises a block diagram depiction of a control unit embodiment as configured in accordance with the invention.

Referring now to FIG. 2, the control unit 11 includes a processing unit 22 as provided, for example, through use of a microprocessor with supporting circuitry and outlying components. The processing unit 22 preferably comprises a programmable platform that is programmable to effect the activities described below. The processing unit 22 couples to a user interface 23 which will typically be disposed in a manner that is accessible to a user (more details regarding the user interface 23 are provided below). The user interface 23 allows a user to interact directly with the control unit 11 to effect, for example, a learning mode as described below. In this embodiment, the processing unit 22 also couples to a wireless receiver 24 that at least receives transmissions from various transmitters including the remote control transmitters that are authorized through pre-registration with the control unit 11. In addition, the processing unit 22 couples to a memory 25. This memory contains the transmitter information noted above. With momentary reference to FIG.

4, the memory has a plurality of memory locations with each memory location having a memory location address. For example, as depicted, the first memory location 41 has address "1". Stored at that memory location 1 is a unique identifier 43 (in this example, "ID A") for a corresponding transmitter and an area 44 where blocking information can be stored. In this example, the unique identifier stored at memory location 1 is not blocked. Conversely, the unique identifier stored at memory location 2 (denoted by reference numeral 42) has a blocking indicator stored at its respective blocking indication area 45. Similarly, other memory locations (such as memory location N) can have a unique identifier stored in conjunction with a blocking indicator 46. (It should be noted that, if desired, a system can have multiple transmitters that share the same unique identifier. This may be done, for example, to identify one group of users as distinct from other users. When this practice is engaged, the entire group can be blocked by blocking a single entry of that shared unique identifier in the memory.)

Figure 3:
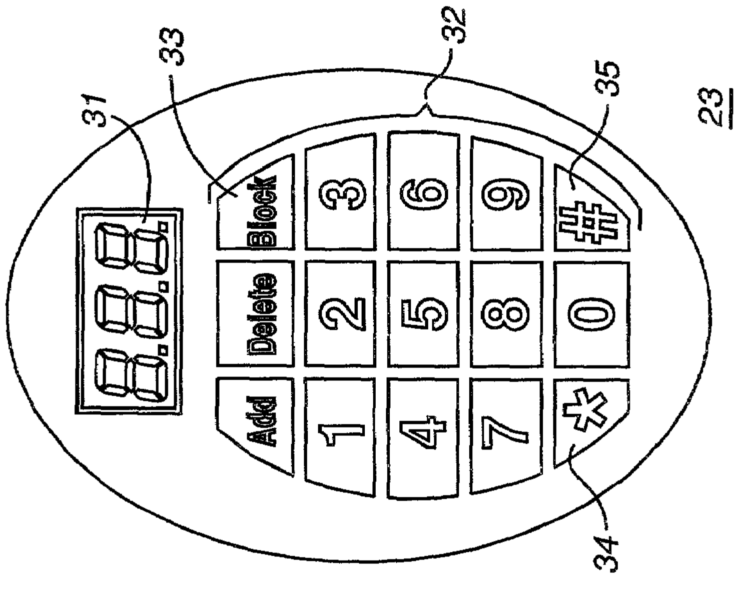
FIG. 3 comprises a front elevational view of a user interface embodiment as configured in accordance with the invention.
Figure 4:
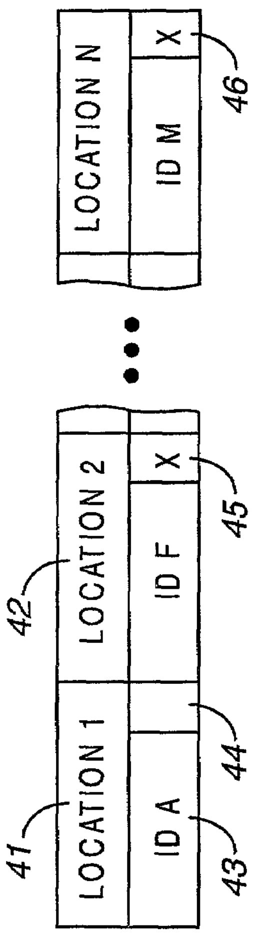
FIG. 4 comprises an illustrative depiction of memory contents as configured in accordance with the invention.

Referring now to FIG. 3, the user interface 23 includes a display 31 and a keypad 32. The display 31 allows various information to be presented to the user as appropriate to various supported functionality. The keypad 32 comprises a tactile interface that allows a user to enter information and/or express commands to the control unit 11. For example, in this embodiment, to initiate blocking and unblocking actions the user asserts the "Block" key 33. By contrast, to initiate a display blocking information mode the user simultaneously asserts the asterisk "*" key 34 and the numeral key "5." To conclude such a mode the user asserts the pound sign "#" key 35.

So configured, the control unit 11 comprises a programmable platform that is readily programmed to act as described herein.

Figure 5:
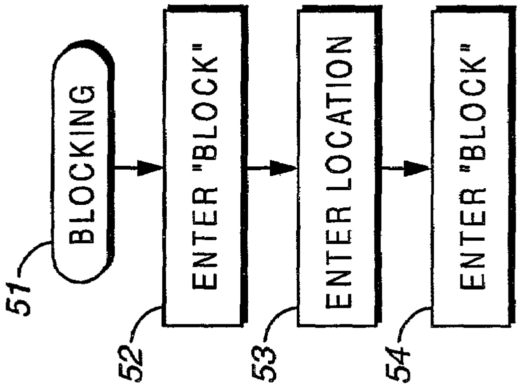
FIG. 5 comprises a flow diagram embodiment as configured in accordance with the invention.

With reference to FIG. 5, to block 51 a given transmitter from having present ability to control the corresponding function (in this example, movable barrier operation) without removing the transmitter information from the memory 25, the user uses the user interface keypad 32 to assert 52 the "Block"key 33. This places the control unit 11 in a block functionality mode. Next, the user enters 53 the memory location for the transmitter that the user desires to block (again using the keypad 32). To conclude, the user once again asserts 54 the "Block" key 33 and the process concludes. This action will result in storing a blocking indicator at the memory location indicated. If no transmitter information is stored at a memory location that a user designates for blocking, a visual or audible indicator of this circumstance can be provided. In addition, and as may be appropriate to a particular application, when no transmitter information exists at a memory location designated for blocking, the blocking command can be ignored.

Figure 6:
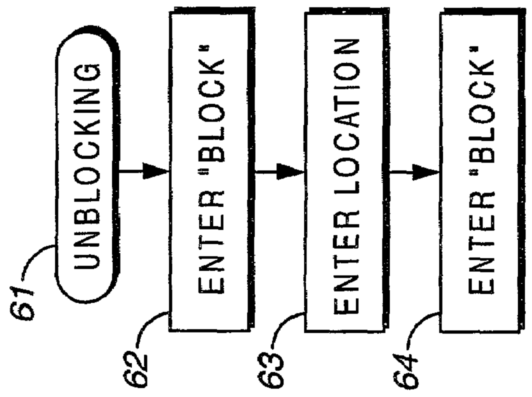
FIG. 6 comprises another flow diagram embodiment as configured in accordance with the invention.

With reference to FIG. 6, much the same process is used to unblock a previously blocked transmitter. To initiate the unblocking process 61, the user again asserts the "Block" key 33, and then again enters 63 the memory location for the transmitter that is to be unblocked. The process concludes when the user again asserts 64 the "block" key 33. This action will result in removing the blocking indicator at the memory location indicated.

The above actions allow a specific transmitter at a specific memory location to be blocked or unblocked. These actions do not, however, provide the user with information regarding whether the transmitter at the indicated location is blocked or not. If desired, an indication can be provided on the display when displaying the memory location address to indicate blocked or unblocked status. Even when this is done, however, that only provides blockage information when the specific memory location address is called up by the user for whatever reason.

Figure 7:
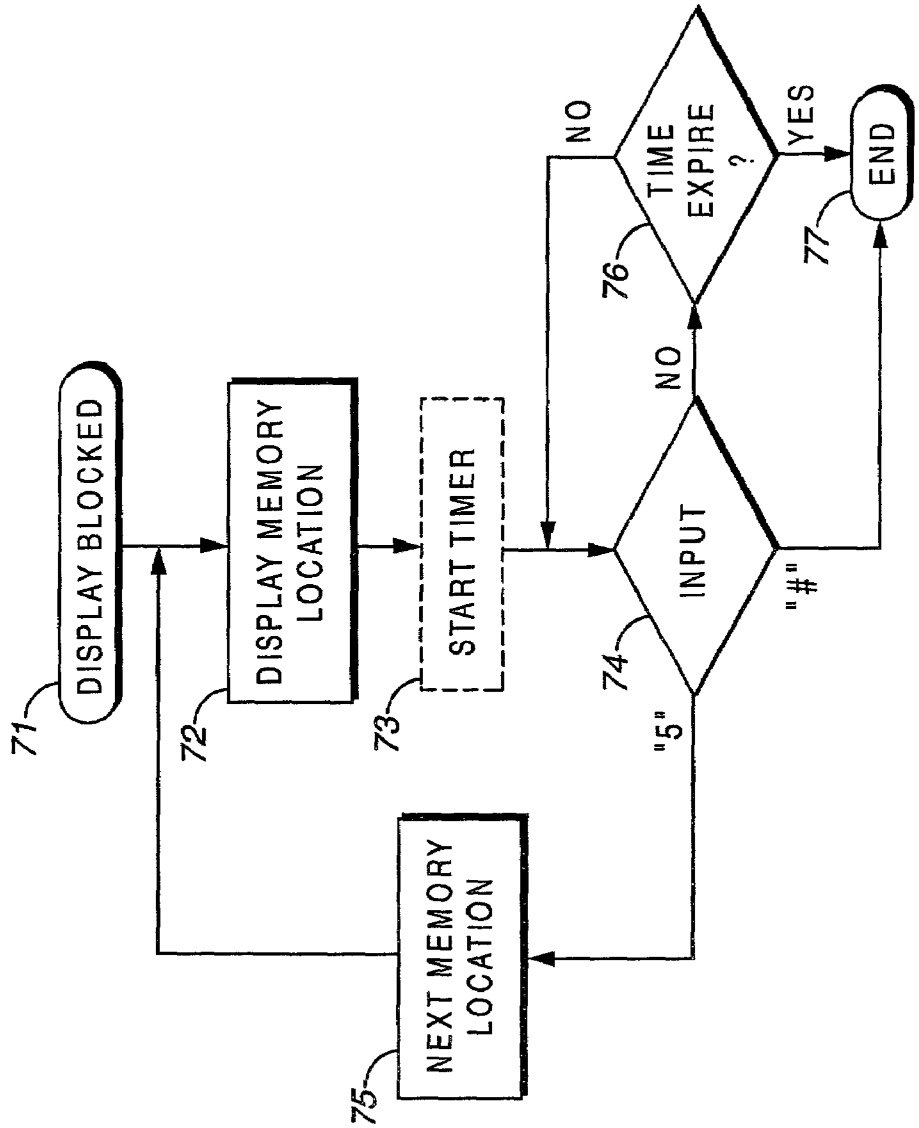
FIG. 7 comprises yet another flow diagram embodiment as configured in accordance with the invention.

FIG. 7 provides a way to give the user specific information regarding which memory locations contain unique identifiers that are presently blocked. To begin the display of blockage information 71, the user initiates the process through interaction with the user interface 23. In this embodiment, the user asserts the asterisk key 34 combined with assertion of the numeral 5 key. Other combinations could of course be utilized as desired, and/or a dedicated input mechanism provided to initiate this process.

Once initiated, this display process 71 displays 72 at least one memory location that contains unique identifier information that is presently blocked. In this embodiment, with only a modest 3-digit display 31, only a single memory location address is presented at any one moment. The particular memory location selected for initial display can be selected in a variety of ways. In a preferred embodiment, the lowest memory address having a blocked unique identifier is displayed first, with sequentially increasing addresses being displayed in seriatim fashion thereafter. This could be reversed if desired, with the largest memory address being displayed first. Or, if desired, the particular address can be selected some other way or even randomly selected as may be appropriate to a given application. A timer is initiated 73 and the control unit 11 then monitors for input 74. If the user enters, in this embodiment, the number "5" using the user interface keyboard 32, the control unit 11 advances 75 to the next memory address that contains a blocked identifier, and the process repeats by displaying that address on the display 31. If the user enters instead, in this embodiment, a pound "#" sign 35, the process concludes 77. And, if the timer option has been used, when the time expires 76 without further input the process ends 77 as well.

So configured, the user can view each memory location that harbors a blocked identifier without having to view any unblocked memory locations. As depicted, when all of the blocked memory locations have been presented, the process will simply begin again at the beginning of the list and present again an earlier displayed memory location (in this instance, that would be the first displayed memory location). If desired, instead of repeating the information, a message could be provided to the user to inform the user that all of the blocked locations had already been displayed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, in the embodiment described, a positive indicator is stored in the memory to indicate that a given transmitter is blocked and the absence of an indicator indicates unblocked status. This could be done in other ways. For example, a positive indicator could be used to indicate unblocked status and the absence of an indicator could indicate blocked status. Either of the above two schemes can be implemented with only a single memory bit If additional bits are available, then a specific positive entry can be used to indicate blocked status and a different specific positive entry used to indicated unblocked status. Also, as presented above, memory locations are displayed one at a time as the user asserts a key to move through the list of blocked items. If desired, his sequential shifting can be automated such that the memory locations change automatically after, for example, a predetermined amount of time, such as 5seconds.

We claim:

1. A method for use with a control device, which control device is operably coupleable to a movable barrier operator and receives movable barrier operator instructions from a plurality of transmitters, each of which transmitters is identifiable by a unique identifier, the method comprising:

providing a memory containing a plurality of the unique identifiers, wherein at least some of the unique identifiers can also have stored in correspondence therewith a blocking indicator to indicate that the unique identifier associated with the blocking indicator is not authorized to control at least one aspect of the movable barrier operator;

upon detecting assertion of a first user interface input that comprises a command to display blocked unique identifiers, displaying at least a first memory location address as corresponds to a unique identifier as is then stored in the memory in association with one of the blocking indicators.

2. The method of claim 1 and further comprising, upon detecting assertion of a second user interface input that comprises a command to display additional blocked unique identifiers, displaying at least an additional memory location address as corresponds to a unique identifier as is then stored in the memory in association with one of the blocking indicators.

3. The method of claim 2 wherein, when there is no additional blocked unique identifier to display, displaying at least one earlier displayed memory location address as corresponds to a unique identifier as is then stored in the memory in association with one of the blocking indicators.

4. The method of claim 1 wherein detecting assertion of the first user interface input comprises detecting tactile assertion of the first user interface.

5. The method of claim 4 wherein detecting tactile assertion of the first user interface includes detecting tactile assertion of a keypad.

6. The method of claim 4 and further comprising providing a keypad that includes an "*" key and wherein detecting tactile assertion of the first user interface includes detecting tactile assertion of the "*" key.

7. The method of claim 6 wherein detecting tactile assertion of the first user interface includes detecting tactile assertion of at least one additional key following assertion of the "*" key.

8. The method of claim 7 wherein detecting tactile assertion of at least one additional key includes detecting tactile assertion of the "5" key.

9. The method of claim 7 and wherein detecting assertion of a second user interface input includes detecting tactile assertion of only the at least one additional key.

10. A device for use with a movable barrier operator comprising:

memory means for storing identifying information as corresponds to a plurality of remote control transmitters and blocking information in association with any identifying information that corresponds to specific remote control transmitters that are not fully authorized with respect to the movable barrier operator;

display means for displaying at least memory location addresses;

user interface means for causing memory location addresses that correspond to identifying information for blocked remote control transmitters to be displayed in response to a command that blocked transmitters be displayed.

11. The device of claim 10 wherein the user interface means displays only one memory location address at a time.

12. The device of claim 11 wherein the user interface means further causes the display to iterate a serial presentation of memory location addresses for blocked remote control transmitters.

13. The device of claim 11 wherein the user interface means further causes the display to present a previously presented memory location address for a blocked remote control transmitter when memory location addresses for all presently blocked remote control transmitters have already been displayed.

14. The device of claim 13 wherein the user interface means comprises a keypad.

15. A method for use with a control device that receives instructions from a plurality of transmitters, each of which transmitters is identifiable by a unique identifier, the method comprising:

providing a memory containing a plurality of the unique identifiers, wherein at least some of the unique identifiers can also have stored in correspondence therewith a blocking indicator to indicate that the unique identifier associated with the blocking indicator is not authorized to provide at least one instruction;

upon detecting assertion of a first user interface input that comprises a command to display blocked unique identifiers, displaying at least a first memory location address as corresponds to a unique identifier as is then stored in the memory in association with one of the blocking indicators.

* * * * *

UNITED STATES PATENT AND TRADEMARK OFFICE

CERTIFICATE OF CORRECTION

PATENT NO. : 7,107,040 B2 
APPLICATION NO. : 10/073667
DATED : September 12, 2006
INVENTOR(S) : Study et al.

It is certified that error appears in the above-identified patent and that said Letters Patent is hereby corrected as shown below:

In Claim 12, Col. 6, line 22 (approximately), delete “serial” and insert -- seriatim --.

Signed and Sealed this

Thirtieth Day of January, 2007

JON W. DUDAS
*Director of the United States Patent and Trademark Office*